United States Patent [19]

Könönen

[11] Patent Number: 4,673,066
[45] Date of Patent: Jun. 16, 1987

[54] BRAKE IN A LIGHT-CONSTRUCTED TRANSPORT CARRIAGE

[75] Inventor: Juhani Könönen, Hyvinkää, Finland

[73] Assignee: Elevator GmbH, Baar, Switzerland

[21] Appl. No.: 831,276

[22] Filed: Feb. 20, 1986

[30] Foreign Application Priority Data

Feb. 20, 1986 [FI] Finland ................................ 850689

[51] Int. Cl.⁴ .............................................. F16D 65/14
[52] U.S. Cl. ........................................ 188/119; 188/21
[58] Field of Search ............... 188/4 R, 4 B, 5, 19, 188/21, 22, 23, 119, 122, 123, 131; 180/140; 280/47.11, 88, 95 R

[56] References Cited

U.S. PATENT DOCUMENTS 709,838  9/1902  Williams ............................... 188/5
3,154,316  10/1964  Göhmann ....................... 188/119 X
4,372,407  2/1983  McColl ........................... 180/140 X Primary Examiner—Duane A. Reger
Attorney, Agent, or Firm—Browdy and Neimark

[57] ABSTRACT

A brake for a substantially light-constructed transport carriage includes a frame part, wheels and a part for drawing the carriage, the draw part being turnably carried in the frame part so that it can be lifted into vertical position to produce a braking effect. The problems encountered in existing brake mechanisms include wear and consequent abundant need of maintenance, and unreliable operation of the brakes. These are solved by arranging in the carriage between the draw means and the wheels, preferably the front wheels, a mechanism by which the front wheels turn in opposite directions when the draw part is lifted into its upper position.

6 Claims, 6 Drawing Figures

shows the shears means in elevational view,
when the draw means is in its vertical position.

BRAKE IN A LIGHT-CONSTRUCTED TRANSPORT CARRIAGE

BACKGROUND OF THE INVENTION

The present invention concerns a brake, substantially for a light-constructed transport carriage, said carriage comprising a frame part, wheels, and a draw means, said draw means being turnably connected to the frame in such manner that it can be lifted into upright position to produce a braking effect.

Transport carriages like this are particularly used at airports for transporting air cargo containers. They are often towed in a string with the aid of a truck or equivalent. Because of the safety regulations in force on airports, the carriages must have a brake which arrests at least one wheel, whereby the carriage when it is loose cannot be set in motion inadvertently by the wind or by an airplane's slipstream. The brake may also be called a parking brake because it is primarily used to hold the carriage stationary.

Many different kinds of brake mechanism have been used in transport carriages heretofore. One such is a drum brake resembling a car brake and which is arrested by lifting up over a cable the draw means or a rope connected to the drum brake. A drum brake may be provided on one or several wheels. Also in use is a brake rod operated over a cable or a chain and which engages with the outer surface of a wheel or wheels when the draw means is lifted up. A brake shoe may naturally also be used instead of the brake rod.

These brake mechanisms of prior art are however embarrassed by several drawbacks which render their use unreliable and awkward. The drawback of a drum brake is its seizing, in which case the wheel cannot rotate. On the other hand, the holding capacity of the drum may diminish owing to wear, rusting or another cause. A brake shoe, again, loses its hold, or requires adjustment, when the wheel and/or the shoe suffers wear.

THE OBJECT OF THE INVENTION

The object of the present invention is to provide a brake not associated with the drawbacks mentioned above and which still holds the transport vehicle strictly stationary when required. The invention is therefore characterized in that on the carriage has been arranged between the draw means and the wheels, preferably the front wheels, a mechanism by mediation of which the front wheels are turned in opposite directions when the draw means is lifted into its upper position.

An advantageous embodiment of the invention is characterized in that the mechanism comprises a shears means connected over a rod linkage to the draw means, and wheel-turning arms connected thereto over a rod linkage.

Another advantageous embodiment of the invention is characterized in that the mechanism arranged between the draw means and the front wheels of the carriage consists of tooth racks and wire cables.

It may be mentioned as one of the most important advantages gained by the invention that the brake is exceedingly reliable in operation and not subject to wear, whence follows that its service life is substantially longer than that of any brakes known in the art. The brake of the invention also needs no adjustment and no maintenance.

BRIEF DESCRIPTION OF THE DRAWINGS

The invention is described in detail in the following with the aid of preferred embodiment examples, referring to the attached drawings, wherein.

DETAILED DESCRIPTION OF THE PREFERRED EMBODIMENT

Figure 1:
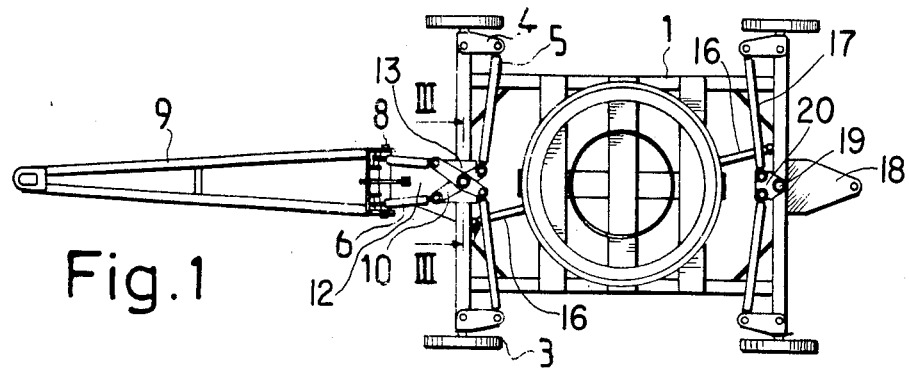
FIG. 1 presents a light-constructed transport carriage provided with a brake mechanism according to the invention, in top view.
Figure 2:
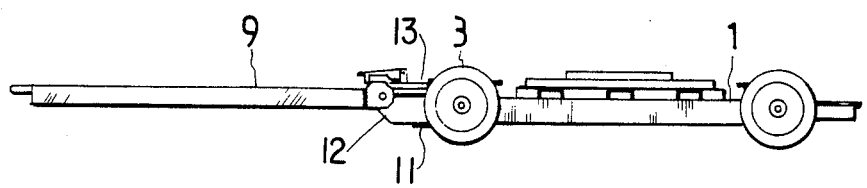
FIG. 2 shows the same in elevational view.
Figure 3:
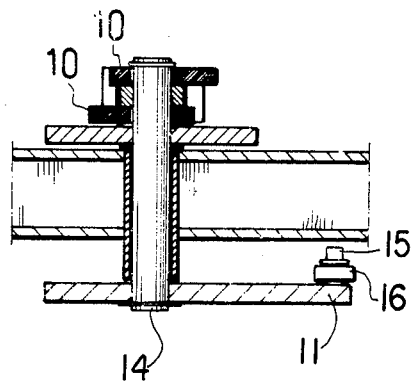
FIG. 3 presents the section carried along the line III—III in FIG. 1.
Figure 7:
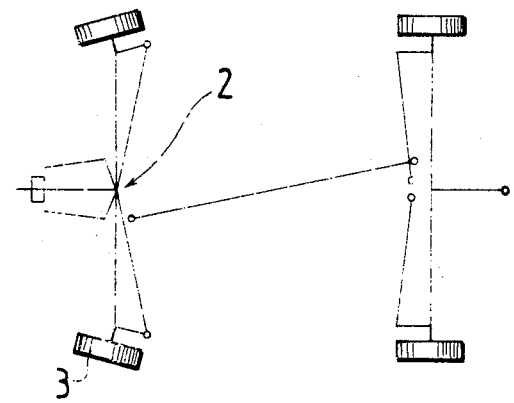
FIG. 7 presents the transport carriage schematically in top view, when the front wheels are positioned at a toe-in angle.
Figure 4:
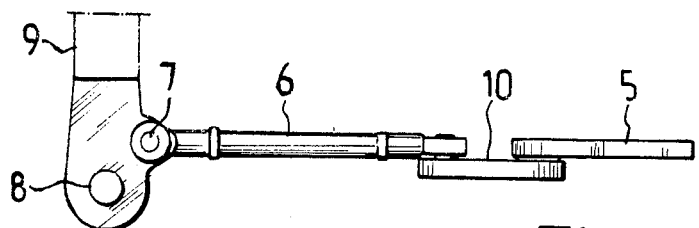
FIG. 4 shows the shears means in elevational view, when the draw means is in its vertical position.
Figure 5:
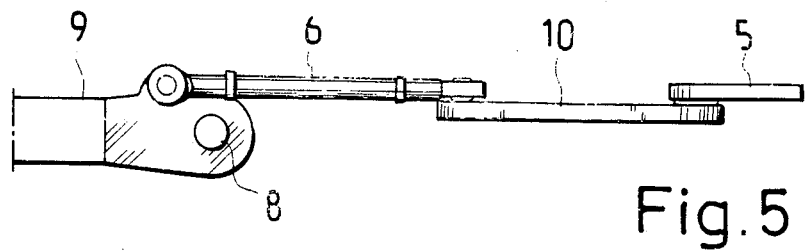
FIG. 5 shows the shears means in elevational view, when the draw means is in the towing position.
Figure 6:
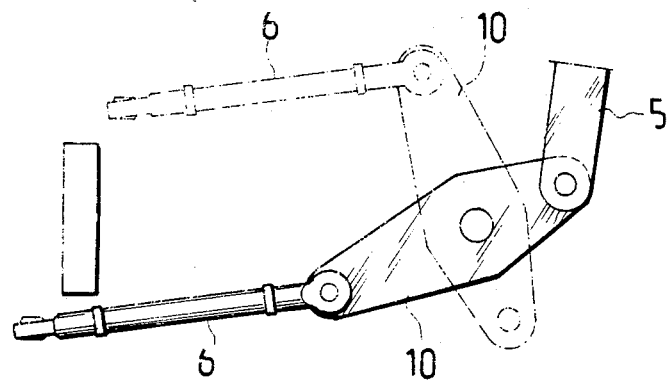
FIG. 6 illustrates the operation of the shears member and the rod linkages thereto connected.

In FIG. 1 is depicted a transport carriage according to the invention, in top view. The transport carriage comprises a frame part 1, four wheels 3 rotatably carried in this frame, and a draw means 9, which is elongated and has been turnably carried on the frame part by means of a pivot 8 in a tongue 12 having upper and lower parts 11, 13 mounted to rotate on a shaft 14 extending through the frame part 1. The reference numeral 2 (FIG. 7) indicates the brake mechanism as taught by the invention. FIG. 2 also shows the front wheels (for instance the wheels on the left) being oppositely connected to the rear wheels (on the right), by connecting rod 16 shown in FIGS. 1 and 3. The principle of operation of the brake mechanism is as follows. When it is desired to arrest the carriage with the aid of the brake to be stationary, the draw means 9 is lifted up, i.e., it is turned up through 90 degrees with reference to the pivot 8 provided in the torque 12. The tongue 12 has upper and lower part 13, 11 pivoting on vertical shaft 14. When the draw means is thus lifted, the linkage moving rods 6 eccentrically connected with the draw means over pivots 7 turn a shears means including arm 10 connected to the other end of a respective linkage rod (6). The arm 10 in its turn moves the linkage rod 5 pivotally attached thereto, and which over the wheel-turning arm 4 turns the front wheel 3 into a toe-in position with respect to the other wheel (FIG. 7). The transport carriage will then be held stationary, fully arrested. Each end of the arm 10 can be pivoted a different distance from the vertical axis. It goes without saying that on the draw means has been provided a locking means by which it is held in the upright position until it is desired once more to release the brake.

The connecting rod 16 can be connected at a first end to the lower part 11 of the tongue 12, and at a second end to the other pair of wheels, namely via the further tongue 18 via a respective vertical axis and respective linkage rods and turning arms. Thus, for rotation the two pairs of wheels can be oppositely connected, while at the same time the front wheels can be misaligned to provide a braking effect when desired by lifting the draw means 9.

Instead of the linkage mechanism just described it is naturally possible to employ for instance appropriate tooth rack, chain and wire cable transmissions between the draw means 9 and the front wheels 3. Most essential in the invention is the feature that the wheels are turned in opposite directions.

It is obvious to a person skilled in the art that the invention is not confined to the embodiment examples presented above and that it may be varied within the scope of the claims following below.

I claim:

1. A carriage comprising
    a frame part (1) with a vertical pivot,
    a tongue (12) pivoting about said vertical pivot (14), said tongue (12) having a horizontal pivot (8),
    a draw means (9) connected to said tongue (12) by said horizontal pivot (8) so that it can be lifted up,
    wheels including a pair of turnable wheels (3) each of which has a wheel-turning arm (4) for being turned with respect to said frame part, and
    moving means connected between said draw means (9) and the wheel-turning arm (4) of at least one of said turnable wheels (3), said moving means comprising
        at least one moving rod (6) connected at a first end eccentrically to said draw means (9) with respect to said horizontal pivot (8),
        at least one linkage rod (5) connected pivotably at one end to one of said wheel turning arms (4), and
        shear means arranged to pivot on said frame part (1) and to have ends connected to a second end of said at least one moving rod (6) and to another end of said at least one linkage rod (5), wherein, upon lifting the draw means (9) to a vertical position, said pair of turnable wheels (3) are turned to be substantially non-parallel and to provide a substantial braking effect for the carriage.

2. The carriage of claim 1, comprising
    two of said moving rods (6) connected to said draw means (9) and two of said linkage rods (5) connected to respective wheel turning arms (4) of said pair of wheels, and
    said shear means including two substantially similar arms (10), which are pivoted with respect to each other substantially by their central parts, and are pivoted at respective ends to the two adjacent moving rods (6) and two linkage rods (5), so that lifting of the draw means causes opposite rotations of the respective turnable wheels (3).

3. The carriage of claim 2, wherein the ends of each of said arms (10) is at a different distance from said vertical pivot.

4. The carriage of claim 2, wherein said wheels consist of said pair of wheels and a further pair of wheels, and the two pairs of wheels are oppositely connected by a connecting rod (16) for rotation with respect to said frame part (1), said tongue (12) having a lower part (11) to which a first end of said connecting rod 12 is pivotably connected.

5. The carriage of claim 2, said vertical pivot comprising a shaft (14) extending vertically through said frame part (1), said tongue (12) comprising upper and lower parts (13, 11) connected to said vertical shaft (14), and said arms (10) pivoting in opposite directions on said vertical shaft (14) when said draw means (9) is raised and lowered to produce said braking effect.

6. The carriage of claim 1, wherein the carriage is steered by pulling said draw means (9) in a lowered position, until said braking effect is achieved by sufficiently raising said draw means (9) to mis-align said pair of wheels, said draw means (9) thus allowing independent parallel and misaligned turning of said pair of wheels.

* * * * *